US009892115B2

(12) United States Patent
Waibel

(10) Patent No.: US 9,892,115 B2
(45) Date of Patent: Feb. 13, 2018

(54) TRANSLATION TRAINING WITH CROSS-LINGUAL MULTI-MEDIA SUPPORT

(71) Applicant: Facebook, Inc., Menlo Park, CA (US)

(72) Inventor: Alexander Waibel, Murrysville, PA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/589,658

(22) Filed: Jan. 5, 2015

(65) Prior Publication Data

US 2015/0154185 A1 Jun. 4, 2015

Related U.S. Application Data

(63) Continuation-in-part of application No. 14/302,146, filed on Jun. 11, 2014, and a continuation-in-part of application No. 14/302,149, filed on Jun. 11, 2014, now abandoned.

(60) Provisional application No. 61/833,668, filed on Jun. 11, 2013.

(51) Int. Cl.
  *G06F 17/28* (2006.01)
  *G10L 15/00* (2013.01)
  *G06F 17/24* (2006.01)
  *G06F 17/27* (2006.01)

(52) U.S. Cl.
  CPC ............ *G06F 17/289* (2013.01); *G06F 17/24* (2013.01); *G06F 17/2705* (2013.01); *G10L 15/005* (2013.01); *G06F 17/28* (2013.01); *G06F 17/2818* (2013.01); *G06F 17/2827* (2013.01)

(58) Field of Classification Search
  CPC ...... G06F 17/27; G06F 17/2715; G06F 17/28; G06F 17/2818; G06F 17/2827
  USPC ....... 704/2, 3, 4, 5, 235, 246, 270, 275, 277
  See application file for complete search history.

(56) References Cited

U.S. PATENT DOCUMENTS

| 5,768,603 A * | 6/1998 | Brown ................ G06F 17/2755 704/232 |
| 6,178,434 B1 * | 1/2001 | Saitoh ............... G06F 17/30014 707/E17.013 |
| 6,636,238 B1 * | 10/2003 | Amir ................... G06F 17/3074 707/E17.101 |
| 9,317,500 B2 | 4/2016 | Hwang |
| 2007/0048715 A1 * | 3/2007 | Miyamoto .......... G06F 17/2745 434/308 |

(Continued)

OTHER PUBLICATIONS

United States Office Action, U.S. Appl. No. 14/302,149, dated Jul. 17, 2015, 23 pages.

(Continued)

*Primary Examiner* — Forrest F Tzeng
(74) *Attorney, Agent, or Firm* — Fenwick & West LLP

(57) ABSTRACT

An improved lecture support system integrates multi-media presentation materials with spoken content so that the listener can follow with both the speech and the supporting materials that accompany the presentation to provide additional understanding. Computer-based systems and methods are disclosed for translation of a spoken presentation (e.g., a lecture, a video) along with the accompanying presentation materials. The content of the presentation materials can be used to improve presentation translation, as it extracts supportive material from the presentation materials as they relate to the speech.

20 Claims, 6 Drawing Sheets

(56) References Cited

U.S. PATENT DOCUMENTS

| | | | |
|---|---|---|---|
| 2008/0021698 A1* | 1/2008 | Itoh | G06F 17/2735 704/2 |
| 2008/0027705 A1* | 1/2008 | Koga | G06F 17/2818 704/2 |
| 2008/0077392 A1* | 3/2008 | Kamatani | G06F 17/2827 704/7 |
| 2008/0120091 A1* | 5/2008 | Waibel | G06F 17/289 704/2 |
| 2008/0233980 A1* | 9/2008 | Englund | G06F 17/289 455/466 |
| 2008/0312928 A1* | 12/2008 | Goebel | G10L 15/26 704/255 |
| 2009/0281789 A1* | 11/2009 | Waibel | G06F 17/2735 704/3 |
| 2011/0015919 A1* | 1/2011 | Rosart | G06F 17/211 704/2 |
| 2011/0063503 A1* | 3/2011 | Brand | H04N 5/4401 348/500 |
| 2014/0377721 A1 | 12/2014 | Reid et al. | |
| 2015/0120278 A1 | 4/2015 | Waibel | |

OTHER PUBLICATIONS

United States Office Action, U.S. Appl. No. 14/302,146, dated Mar. 22, 2016, twenty-five pages.
United States Office Action, U.S. Appl. No. 14/589,653, dated Mar. 21, 2016, twenty-five pages.

* cited by examiner

TRANSLATION TRAINING WITH CROSS-LINGUAL MULTI-MEDIA SUPPORT

CROSS REFERENCE TO RELATED APPLICATIONS

This application is a continuation-in-part of U.S. application Ser. No. 14/302,146, filed Jun. 11, 2014 and of U.S. application Ser. No. 14/302,149, filed Jun. 11, 2014, each of these applications claim the benefit of U.S. Provisional Application No. 61/833,668, filed Jun. 11, 2013, all of which are incorporated herein by reference in their entirety. This application also is related to commonly owned U.S. Pat. No. 8,090,570, which also is incorporated herein by reference in its entirety.

BACKGROUND

Recent advances in speech-to-speech translation and automatic multi-media transcription have led to functioning and deployed speech translation and transcription systems of lectures and multi-media presentations. Such support of presentations can be deployed via a client-server architecture or by way of local system installations. The resulting systems provide automatic transcription and translation of lectures, speeches, and multi-media presentations either in real-time, as simultaneous interpretations systems, or as a post-hoc processing step after a presentation has been recorded and archived. They permit an audience to search, retrieve, read, translate, and generally better discover lecture, multi-media, or spoken material that formerly was not accessible because of its spoken form. The output is presented to an audience via various devices acoustically or textually, and it is presented either locally or via the internet to a browser on a listener's personal device or PC.

As listeners follow a lecture or multi-media presentation in another language that they do not understand, other additional forms of support become desirable. For example, in addition to understanding a lecture or multi-media presentation, a user also wishes to understand the visual presentation materials of the presenter as well, and relate what the presenter is saying to the visual presentation materials.

SUMMARY

In one aspect, the present invention is directed to computer-based systems and methods for the language translation of a multi-media presentation (e.g., a spoken lecture, video, webinar, MOOC presentation, etc.) along with the accompanying text-based presentation materials. The translation may be simultaneous with the presentation and/or for post hoc access. The computer-based system may provide an interface that reads presentation materials produced by a lecturer/presenter in a source language and integrates the presentation materials into the overall workflow of a presentation in two important ways. First, translation and delivery of the presentation materials to a listener in translation suitably annotated and aligned with the presentation, so that the listener can follow both the multi-media and the textual presentation materials. Second, using the content of the presentation materials to improve presentation translation, as it extracts supportive material from the presentation materials as they relate to the accompanying speech or audio.

The present disclosure proposes an improved presentation support system that addresses and integrates presentation materials (such as PowerPoint presentations, background lecture notes as well as real-time interactive notes produced during a lecture, e.g., writing on blackboards, chat rooms, videos, flipcharts, photos, etc.), so that the listener can follow with both the audio and the supporting materials that accompany the presentation to provide additional understanding. Although the primary example discussed herein is in the context of a lecture with a slide presentation, the same coordination between various multi-media and text-based materials can be done in the context of webinars, seminars, MOOC presentations, videos and/or photos with associated text, etc.

The figures depict various embodiments of the present invention for purposes of illustration only. One skilled in the art will readily recognize from the following discussion that alternative embodiments of the structures and methods illustrated herein may be employed without departing from the principles of the invention described herein

DETAILED DESCRIPTION

System Architecture

Figure 1:
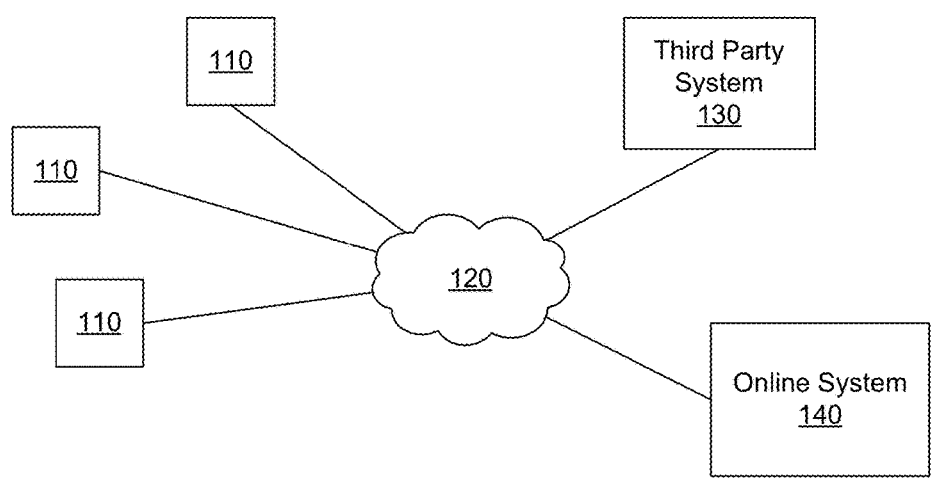
FIG. 1 is a block diagram of a system environment in which a social networking system operates, in accordance with an embodiment of the invention.

FIG. 1 is a high level block diagram of a system environment 100 for a social networking system 140. The system environment 100 shown by FIG. 1 comprises one or more client devices 110, a network 120, one or more third-party systems 130, and the social networking system 140. In alternative configurations, different and/or additional components may be included in the system environment 100. The embodiments described herein can be adapted to online systems that are not social networking systems.

The client devices 110 are one or more computing devices capable of receiving user input as well as transmitting and/or receiving data via the network 120. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party website 130 may also communicate information to the social networking system 140, such as advertisements, content, or information about an application provided by the third party website 130.

Figure 2:
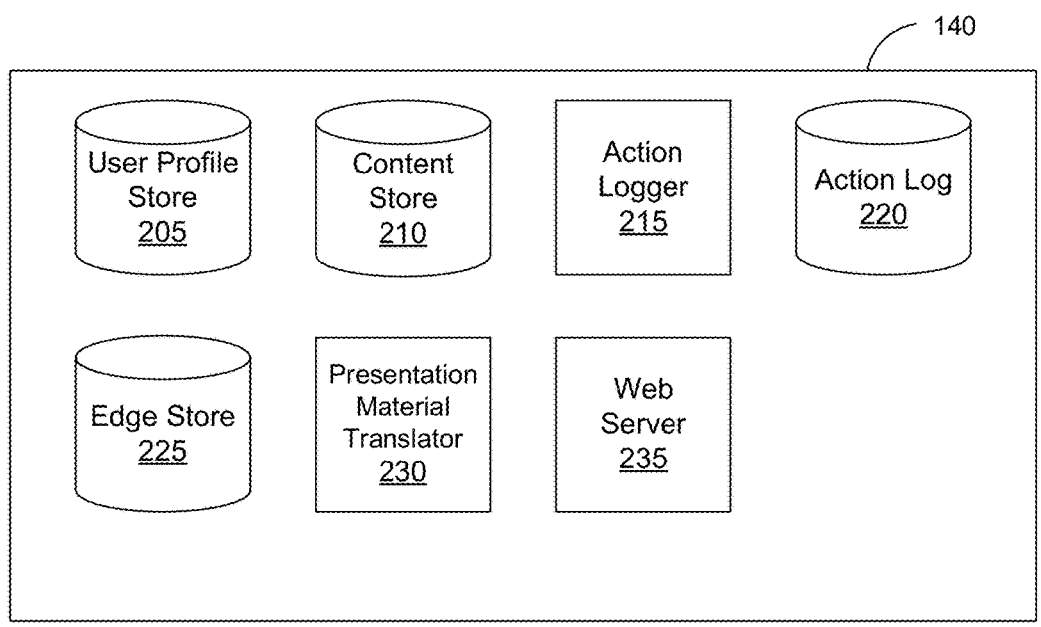
FIG. 2 is a block diagram of a social networking system, in accordance with an embodiment of the invention.

FIG. 2 is an example block diagram of an architecture of the social networking system 140. The social networking system 140 shown in FIG. 2 includes a user profile store 205, a content store 210, an action logger 215, an action log 220, an edge store 225, a presentation material translator 230, and a web server 235. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding user of the social networking system 140. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 140 displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the social networking system, events, groups or applications. In some embodiments, objects are received from third-party applications or third-party applications separate from the social networking system 140. In one embodiment, objects in the content store 210 represent single pieces of content, or content "items." Hence, users of the social networking system 140 are encouraged to communicate with each other by posting text and content items of various types of media through various communication channels. This increases the amount of interaction of users with each other and increases the frequency with which users interact within the social networking system 140.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions are stored in the action log 210. Examples of interactions with objects include: commenting on posts, sharing links, and checking-in to physical locations via a mobile device, accessing content items, and any other interactions. Additional examples of interactions with objects on the social networking system 140 that are included in the action log 220 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the social networking system 140. For example, an e-commerce website that primarily sells sporting equipment at bargain prices may recognize a user of a social networking system 140 through a social plug-in enabling the e-commerce website to identify the user of the social networking system 140. Because users of the social networking system 140 are uniquely identifiable, e-commerce websites, such as this sporting equipment retailer, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying.

In one embodiment, an edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system, sharing a link with other users of the social networking system, and commenting on posts made by other users of the social networking system.

In one embodiment, an edge may include various features each representing characteristics of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 over time to approximate a user's affinity for an object, interest, and other users in the social networking system 140 based on the actions performed by the user. A user's affinity may be computed by the social networking system 140 over time to approximate a user's affinity for an object, interest, and other users in the social networking system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

Figure 3:
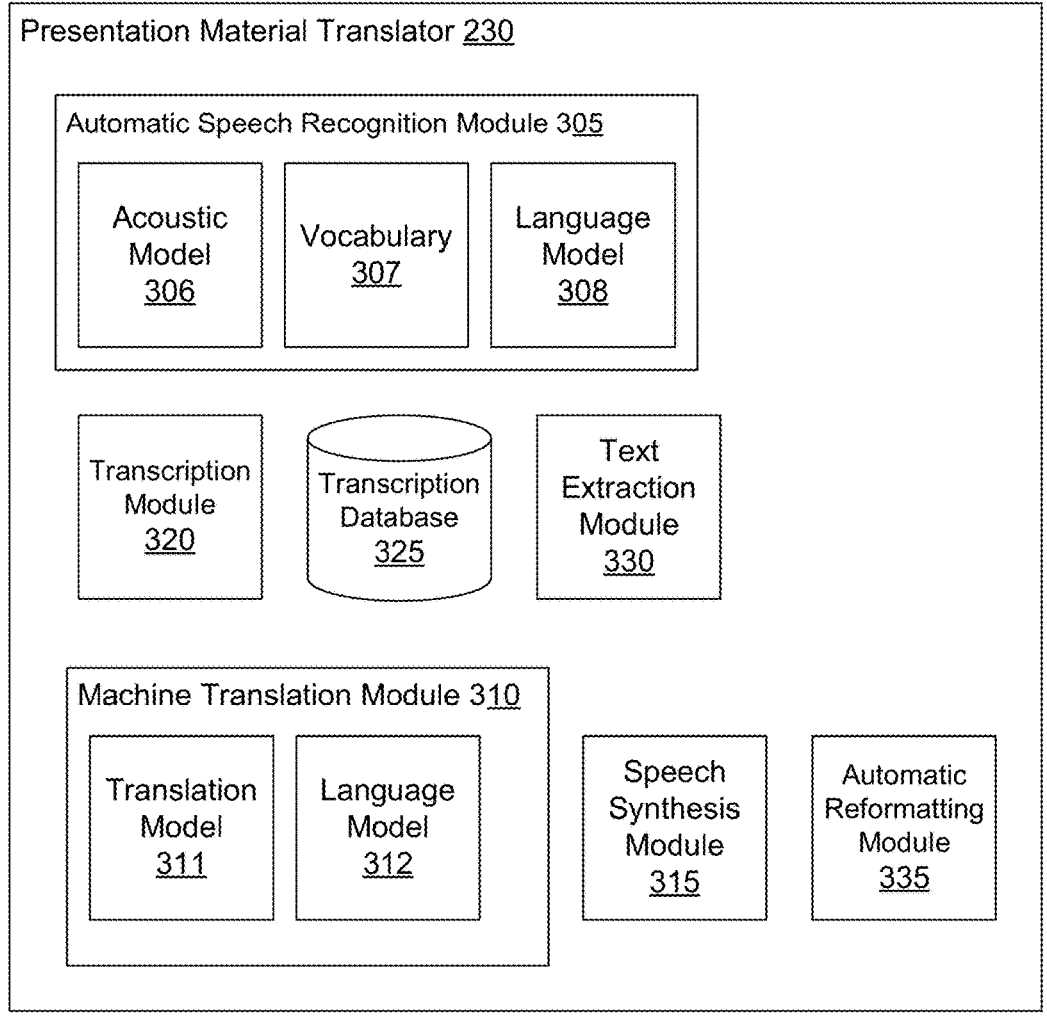
FIG. 3 is a block diagram of a presentation material translator, in accordance with an embodiment of the invention.

FIG. 3 is a block diagram of a presentation material translator, in accordance with an embodiment of the invention. The presentation material translator (PMT) 230 further comprises an automatic speech recognition (ASR) module 305, a transcription module 320, a transcription database 325, a text extraction module 330, a machine translation (MT) module 310, a speech synthesis module 315, and an automatic reformatting module 335.

The PMT 230 translates and aligns various components of a multimedia presentation. A multimedia presentation may comprise a speech component, spoken by a presenter, and a presentation materials component, used by the presenter to augment the speech. The PMT 230 and its components recognize the speech, extract text from the presentation materials, translate the speech and extracted text into a target language, and then align the translated speech and text to be presented in a logically coherent manner. For example, the translated speech may be aligned with the translated presentation such that correct presentation slide is displayed during each segment of the speech.

The automatic speech recognition module 305 recognizes speech by speaker in a first language, and further comprises an acoustic model 306, a vocabulary 307, and a language model 308. The acoustic model 306, vocabulary 307, and language model 308 are well known in the art and thus will not be described further. The transcription module 320 prepares a transcription of the recognized speech in the source language received by the ASR module 305. The transcription database 325 stores the transcription prepared by the transcription module 320. The text extraction module 330 extracts text from presentation materials, such as PowerPoint slides, to be translated by the MT module 310.

The MT module 310 translates the recognized speech in the source language to text in the target language and further comprises a translation model 311 and a language model 312. The translation model 311 and language model 312 are well known in the art and thus will not be described further. The speech synthesis module 315 converts the text in the target language generated by the MT module 310 to audible speech in the target language. This translation of the presentation to the target language may be delivered to end-users in a variety of ways, such as in real time by a local speech translation system (e.g., a local loudspeaker) or via a remote delivery channel, such as via the Internet or some other data communications network. The automatic reformatting module 335 generates presentation materials using the text in the target language translated from the extracted text.

The web server 235 links the social networking system 140 via the network 120 to the one or more client devices 110, as well as to the one or more third party systems 130. The web server 140 serves web pages, as well as other web-related content, such as JAVA®, FLASH®, XML and so forth. The web server 235 may receive and route messages between the social networking system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, WEBOS® or RIM®.

Translation of Multimedia Presentations

Figure 4:
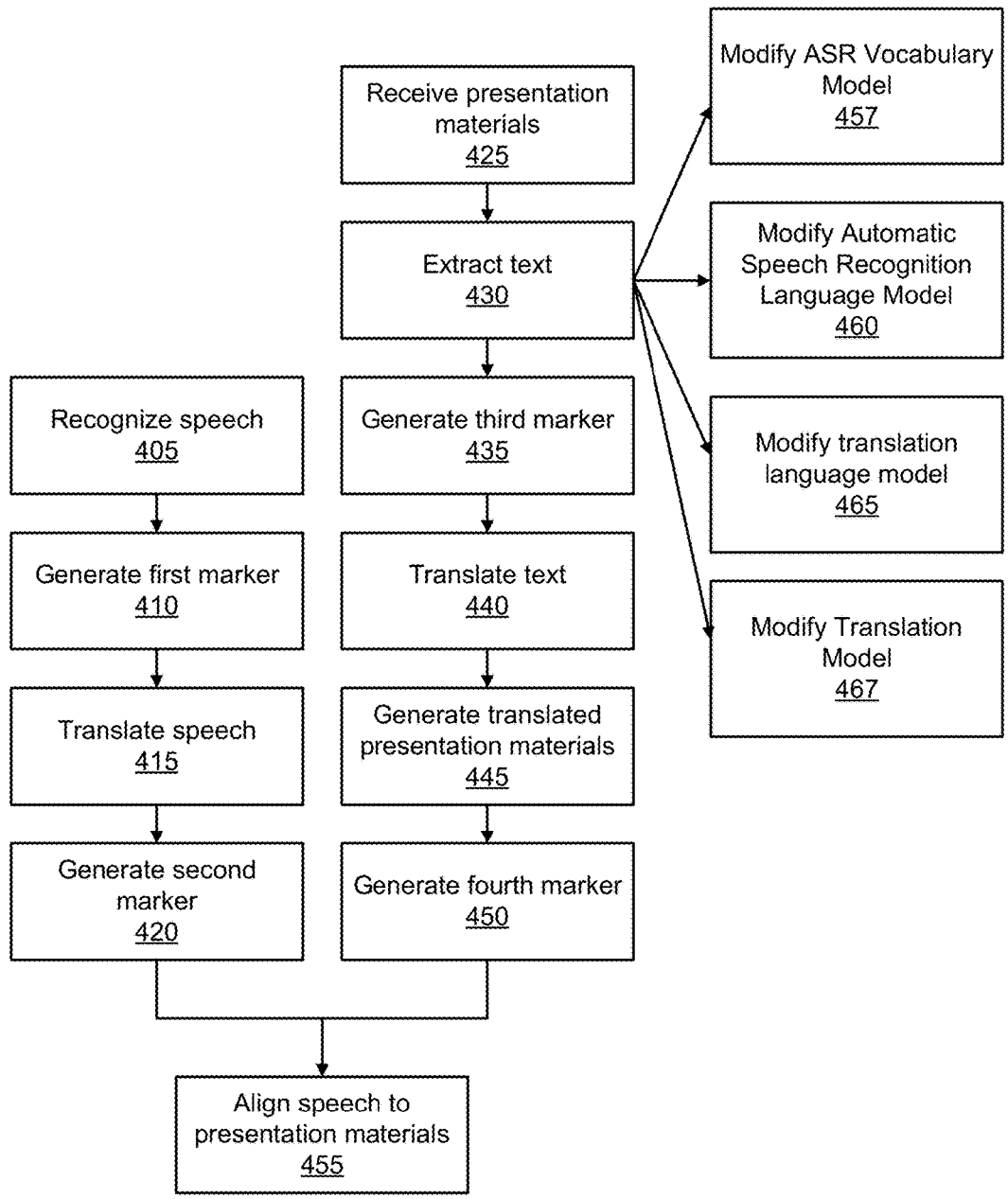
FIG. 4 is a flowchart depicting a method for translating a multimedia presentation, in accordance with an embodiment of the invention.

FIG. 4 is a flowchart illustrating a method for translating and synchronizing various components of a multimedia presentation, according to one embodiment. The translation and synchronization of the multimedia presentation may be performed by components of the presentation material translation (PMT) module 230, further described above with reference to FIG. 3. The multimedia presentation may comprise a speech component and a presentation materials component, such as presentation slides or writing on a whiteboard. The online system 140 may translate the presentation in real-time as the speaker is speaking. In other embodiments, the online system 140 may translate the presentation after the speaker has presented the materials. The online system 140 may translate the various components of the multimedia presentation in parallel, for example translating the speech and the presentation materials simultaneously. In other embodiments, the online system 140 may translate the various components of the multimedia presentation separately and at different times. In some embodiments, the PMT 230 and its various components performs the steps described below with reference to FIG. 4 and FIG. 5.

The online system 140 recognizes speech 405 from a speaker in a first language. Then, a first marker is generated 410 that corresponds to a specific portion of the speech in the first language. The first marker is an identifying feature that is used to synchronize the speech in the first language with the presentation materials. For example, the first marker may be a time-stamp that corresponds with each time the speaker transitions from a presentation slide to the next presentation slide.

The online system 140 then translates the speech 415 into a second language, or target language. Then, a second marker is generated 420 based on the first marker that corresponds to a specific portion of the text in the second language. The second marker is synchronized with the first marker such that the portion of translated text in the second language corresponding to the second marker corresponds to the portion of speech in the first language corresponding to the first marker. The second marker may be a time-stamp or other identifying feature that is used to synchronize the text in the second language with the translated presentation materials, as described above.

The online system 140 may convert the speech in the target language to audible speech in the target language. This translation of the presentation to the target language may be delivered to end-users in a variety of ways, such as in real time by a local speech translation system (e.g., a local loudspeaker) or via a remote delivery channel, such as via the Internet or some other data communications network. The online system 140 also may transcribe the speech in the first or second language. The transcription of the speech may then be stored in the transcription database 325 for later, post hoc, access by end users (such as via the Internet or some other communication network).

In some embodiments, the online system 140 may translate the presentation materials simultaneous with translating the speech from the speaker. The online system 140 first receives presentation materials 425 that are in a first language. In some embodiments, the presentation materials may be PowerPoint slides or other digital presentation materials. In other embodiments, the presentation materials may be handwritten notes on a whiteboard or traditional overhead projector slides. The online system 140 then extracts text 430 in the first language from the presentation materials. In some embodiments, the text extraction module 330 extracts the text 430. The text extraction module 330 may comprise a computer-based, programmable extraction engine as described above with reference to FIG. 3. The presentation materials may be loaded into the text extraction module 330 in any suitable manner. For example, the presentation materials may be read into the text extraction module 330 via a web interface from a PC or other computing device storing the presentation materials. In various embodiments, the same web interface may be used to record and transmit the speech in the first language. When the presentation materials are in native, electronic form (such as, e.g., a PowerPoint presentation, a Word document, a spreadsheet, some PDF documents), the task of extracting the text from the digital presentation materials is straightforward. In other cases, additional steps may need to be taken by the text extraction module 330 in order to extract the text. For example, for other types of presentation materials, optical character recognition (OCR) may need to be performed to detect and extract words in the presentation materials. Such other forms of presentation materials that the text extraction module 330 could support in such a manner include handwritten notes (e.g., on paper or overhead projection transparencies), blackboard writing, non-OCR PDF documents, etc.

The text extraction module 330 may further adapt the extracted text. As mentioned above, the transcription module 320 may generate a transcription, in the source language, of the presenter's spoken presentation. The transcription may be stored in the transcription database 325. According to various embodiments, the text extraction module 330 utilizes the extracted text from the presentation materials in a variety of ways. For example, the text extraction module 330 may use the extracted text from the presentation materials to automatically determine paragraph endings (and beginnings) for the translated text, as well as determine sentence endpointing (e.g., sentence punctuation, such as periods, question marks, etc.). As the presenter switches slides, time-stamps for the slide transitions may be captured, and those time stamps may serve to indicate a conceptual break/change in the presentation, as described above with reference to FIG. 4. Such detected breaks or changes may be used to indicate a paragraph break in the translated text. In one embodiment, the detected slide transitions can be coupled with other cues, including pauses in the speaker's speech and breaks in the language modeling context, to more confidently determine the end of a paragraph. A similar idea may also be applied to improving the punctuation of the extracted text (e.g., inserting periods, commas, question marks, etc.) for better readability. In lecture settings, the spoken presentation may be highly fragmentary, so good language modeling cannot be relied upon uniquely to identify sentence boundaries. Prosodic cues (such as long pauses, pitch variations and prepause lengthening in the speech) may also be indicators of punctuations, but are similarly unreliable. The text in the presentation materials can be used as an additional indicator of where a sentence boundary may best be placed in the text. For example, the bullets in the slides give away logical differences between the argumentation points. To achieve this, words in the presentation materials may be aligned with the words in the extracted text.

Further, the text extraction module 330 may use the extracted text from the presentation materials to identify mathematical formulas in the speech and spell them out with mathematical notation rather than in standard prose. As a presentation is being recognized and text extracted, it generates a sequence of words just as the presenter has spoken them. If the presenter is describing a formula, the presenter may say something like: "F of omega equals the integral from minus infinity to plus infinity of . . . " Such text is not particularly illuminating, may be incomplete as the speaker leaves elements of the formula out of the speech, and/or the recognition may be erroneous. Even with perfect transcription, however, the resulting text is also difficult to read and not very helpful to the reader. Instead, the user would prefer to see the actual formula at this particular point in the speech, e.g., in the above example $F(\omega)=\int_{-\infty}^{\infty}f(t)e^{-iwt}dt$, instead of the word string, "F of omega equals . . . " Obtaining this formulaic rendering is difficult beyond simple functions or expressions, however, as the presenter may leave out elements as the presenter reads and discusses a formula in the presentation. With the presentation slides at the system's disposal, however, formulas in the presentation materials can be utilized and taken advantage of to improve the readability of the extracted text. This may be done, in various embodiments, by scanning the slides' content for graphics, tables and formulas. The transcribed text from the presentation may then be scanned, and a matching alignment between the two (i.e., the scanned slides and the scanned transcription) may be run. Such alignment may identify passages from the presentation where the formulas were described and aligns the most closely matching formula with the corresponding presentation materials. If a close match is found, the text in the extracted text is substituted by the formula from the presentation slide. Even if a sufficiently close match is not found, the most closely aligned formula may be added in the transcription as additional information.

Further, the text extraction module 330 may link elements of the transcribed speech to corresponding elements in the presentation material. By creating hyperlinks between such correspondences, it makes it easier for a user to navigate between segments of extracted text from the transcription and bullets in the slides for faster access and ultimately more efficient grasp of the speakers' argumentation. As such, various portions of extracted text may be hypertext linked to one or multiple text sources, such as, for example, pertinent points in the presentation materials (e.g. PowerPoint slides), supporting academic papers and publications, text books, etc.

Referring back to FIG. 4, the online system 140 then generates a third marker 435 corresponding to a specific portion of presentation materials. The third marker may also correspond to a specific portion of the text in the first language extracted from the presentation materials. The third marker is some identifying feature that is used to synchronize the presentation materials with the speech, as described in further detail above with reference to generating the first marker 410. More specifically, the third marker of the presentation materials corresponds to the first marker of the speech in the first language, and may indicate corresponding points in time or conceptual topics. The online system 140 then translates the extracted text 440 from the first language into the second language. In some embodiments, the translation of the speech and the translation of the extracted text may be performed by the same machine translation module 310. In other embodiments, a different machine translation module 310 may be used for the translation of each component of the multimedia presentation. The MT module 310 may be optimized for the specific format of the presentation materials, such as slide presentations. Such presentation materials tend to include numerous textual bullet points in a telegraphic style-that is, in a style that is highly fragmentary and often with missing verbs or other important elements of proper syntax. The MT module 310 therefore preferably is trained based on slide material and/or parallel corpora of fragmentary material. It can also employ a more general purpose translation engine that has been adapted to the fragmentary style of such slides.

The online system 140 then generates translated presentation materials 445 based on the text in the second language. The translated presentation materials may be rendered in the original format of the presentation materials (e.g. PowerPoint, PDF, etc). If the original format cannot be used, the translated presentation materials may be converted to some other format suitable for delivery to end-users. For example, the machine translation module 310 may produce a translation in the second language for each bullet point in the original presentation materials.

Finally, the online system 140 generates a fourth marker 450 for the translated presentation materials based on the third marker of the presentation materials in the first language. The fourth marker is synchronized with the third marker such that the portion of the presentation materials in the second language corresponding to the fourth marker corresponds to the portion of the presentation materials in the first language corresponding to the third marker. The fourth marker of the translated presentation materials corresponds to the second marker of the translated text in the second language and may indicate corresponding points in time or conceptual topics.

Once the online system 140 has translated the speech and presentation material components of the multimedia presentation, the online system 140 aligns the speech in the second language to the translated presentation materials 455 to synchronize the second marker of the text in the second language with the fourth marker of the translated presentation materials. In some embodiments, the presentation materials comprise presentation slides, and the markers of the speech and presentation materials are time-stamps corresponding to slide transitions. To align the speech in the second language to the translated presentation materials 455, the online system 140 may use the time stamps to determine at what points during the speech to change the presentation slides. In other embodiments, the online system 140 may synchronize the speech and presentation materials before the translation process, or may not translate the speech and presentation materials at all. The online system 140 may then electronically deliver the speech in the second language and the translated presentation materials to end-users via a computer network (e.g., the Internet or a local network), so that the end-user can follow along in the translated presentation materials with the audible translation (or transcription) of the presenter's spoken presentation.

The online system 140 may also use the text extracted from the presentation by the text extraction module 330 to improve the accuracy of the different components used in the speech translation process. For example, the online system 140 may use the extracted text to modify 457 the ASR vocabulary 308, modify 460 the ASR language model 308, modify 465 the translation language model 312, or modify 467 the translation model 311. For example, the extracted text can be used to improve or adapt the vocabulary 307 and/or language model 308 of the automatic speech recognition (ASR) module 305, particularly for named entities and/or special vocabularies (e.g., new words). The named entities and new words pertaining to a presentation of a special topic are extracted from the presentation materials and integrated into various models of the ASR module 305. In various embodiments, this may be done by first using the text of the presentation materials to perform large searches for similar material in the Internet. Next, all unknown words in the text of the presentation materials are identified, as well as in the text of all related materials identified by the search. The integration of these new words may be done at the level of the ASR module 305, for example, by generating pronunciation dictionaries for each new word (to adapt/train the vocabulary 307), and predicting the language model probabilities for such new words based on similar texts (to adapt/train the language model 308). One way of adapting the ASR models in such a manner are described in P. Maergner et al., "Unsupervised Vocabulary Selection for Simultaneous Lecture Translation," Int'l Workshop on Spoken Language Translation, San Francisco, Dec. 8-9, 2011, available at www.iscaspeech.org/archive/iswlt_1 1/papers/sltb_214.pdf, which is incorporated herein by reference in its entirety. Further, the ASR language model 30 may be modified 460 by estimations of language model parameters from large background corpora or using word classes.

The online system 140 may also use the extracted text to modify 465 the language model 308 or to modify 467 the translation model 311 of the machine translation module 310. For example, the extracted text can also be used to adapt/train models of the machine translation (MT) module 310. The language model 312 and/or translation model 311 may be adapted or trained based on the extracted text from the presentation materials, according to various embodiments, by searching for translations of each new word. For example, in one embodiment, the translation model 311 may be modified 457 using such translations found in multilingual Wikipedia articles or other online sources, such as described in J. Niehaus et al., "Using Wikipedia to Translate Domain-Specific Terms in SMT," Institute for Anthropomatics, Karlsruhe Institute of Technology, Germany, 2011, available at isl.anthropomatik.kit.edu/cmu-kit/niehues2011 using.pdf, which is incorporated herein by reference in its entirety. Likewise, the language model 312 may be modified 467 by estimations of language model parameters from large background corpora or using word classes, similar to the modification 460 of the ASR language model 308 described above. As such, the adaptations of the various models of the speech translation system can be integrated, automatic, on-the-fly modification of the overall system's operation, so that it adapts and improves its performance in use, with new presentation material made available, dynamically.

Figure 5:
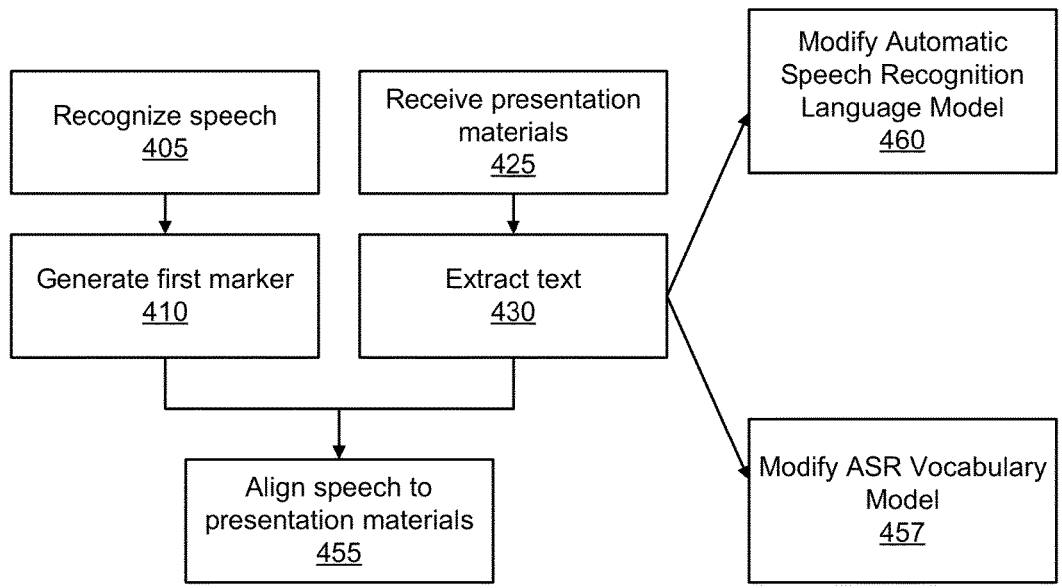
FIG. 5 is a flowchart depicting a method for improving a presentation material translator, in accordance with another embodiment of the invention.

FIG. 5 illustrates a flowchart depicting a method for improving a presentation material translator, in accordance with another embodiment of the invention. In some embodiments, the online system 140 may use text extracted from presentation materials to improve the PMT 230 without necessarily translating the presentation materials. The method depicted in FIG. 5 comprises steps identical to the method depicted in FIG. 4, except the method no longer comprises translating the speech or the presentation materials to a target language. The online system 140 may modify 457, 460 the vocabulary 307 and/or language model 308 of the ASR module 305.

Figure 6:
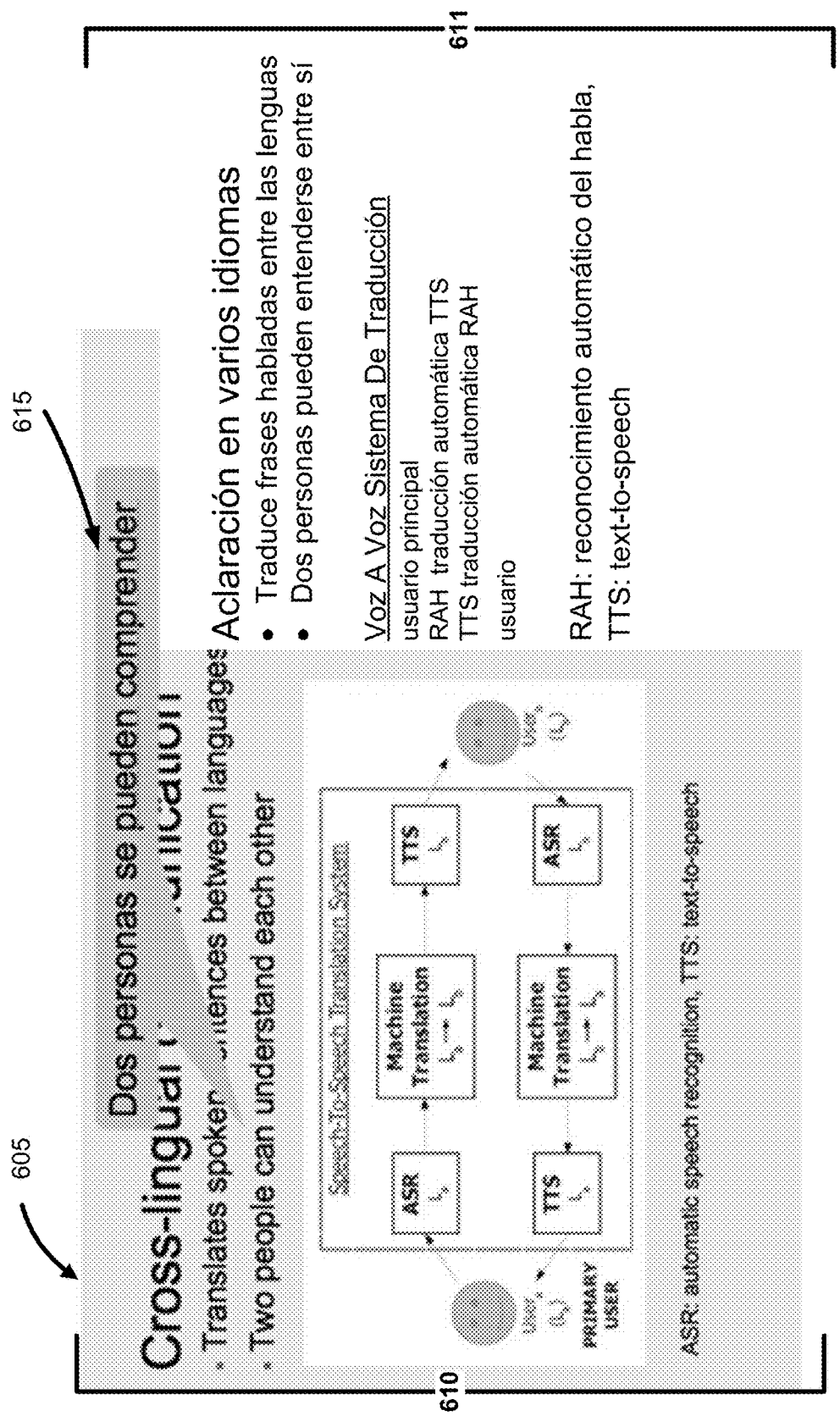
FIG. 6 is a screenshot depicting a user interface for viewing translated presentation materials, in accordance with an embodiment of the invention.

FIG. 6 illustrates a screenshot of a user interface for viewing translated presentation materials, according to one embodiment. The translated presentation materials may comprise presentation slides, such as the depicted slide 605. The slide 605 may further comprise the original text 610 in the source language. In some embodiments, the translated presentation materials may comprise the translated text 611 adjacent to the original text 610. The translated text 611 may be presented in a format that parallels the format of the original text 610, such that a user viewing the slide 605 could easily correlate the translated text 611 to the original text 610. In some embodiments, the slide 605 may comprise a "translation bubble" 615 that displays a portion of the translated text. In some embodiments, the translated text in the translation bubble 615 may only correspond to a certain word or phrase on the slide 605. For example, the text in the translation bubble 615 only corresponds to the line of text to which the translation bubble 615 is pointing. The translation bubble 615 may appear as a result of a user hovering the mouse cursor over a portion of the original text 610.

Figure 7:
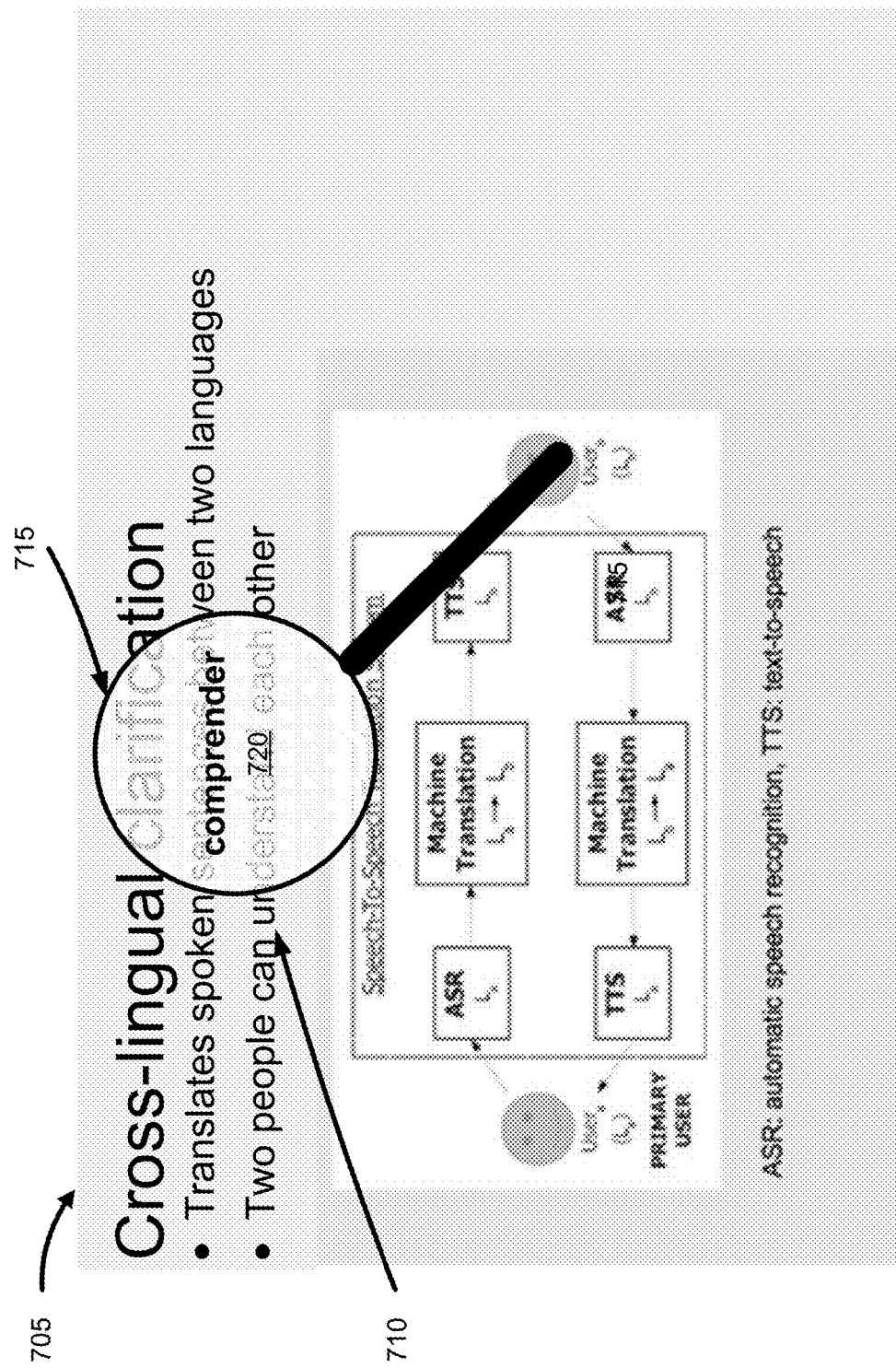
FIG. 7 is a screenshot depicting a user interface for viewing translated presentation materials, in accordance with another embodiment of the invention.

FIG. 7 illustrates a screenshot of a user interface for viewing translated presentation materials, according to another embodiment. The presentation materials may comprise a slide 705, which further comprises text in the source language. The user may use a cursor to move a magnifying glass 715 over a portion of the original text 710. As the magnifying glass 715 passes over the original text 710, translated text 720 may be displayed in the magnifying glass 715.

Further Considerations

In various embodiments, therefore, the present invention is generally directed to computer-based systems and methods where presentation materials in a source language (PowerPoint or similar) input, text in the source language is extracted from the input presentation materials, and a translation of the text into a target language(s) is generated so that a translated version (in another language) of the presentation slide can be delivered to an end user. The delivery to the end-users may be done, for example, over the internet simultaneously during the presentation, or done off-line, such as a post-hoc visualization of the presenter's material. Also, it could be delivered by display device capable of receiving the translated presentation material files, such as a monitor, a projection, or even heads-up display goggles. A translation of the presenter's spoken translation may also be generated and delivered to the end-users. The spoken translation may be delivered over the Internet (like the translated presentation materials), or via a local system.

In the translated presentation materials, in various embodiments, the textual material may be shown in the source language, with the translation thereof rendered at the curser position, allowing the user to mouse over text in a foreign language (the source language) and obtain translations as inserted text (e.g., callouts or floating bubbles, etc.) Also, the translation of the materials may be rendered as a side bar next to the original slide (see FIG. 6), or via a lens graphic (see FIG. 7). Alternatively, the translated presentation materials are delivered by a complete re-rendering of the original slide with text in the source language replaced by text in the source language. Also, text in the translation of the presentation slide may be linked (e.g., hyperlinked) to text in other supporting material, such as research papers, Wikipedia entries, text books, etc. Also, the text in the translation of the presentation slide may be linked to text that was obtained by automatically transcribing speech from the presentation translator (i.e., the translation of the spoken presentation by the presenter). Further, in various embodiments, the translation of the presentation materials may be synchronized with the spoken presentation (either in real time or post hoc). For example, terms and phrases in a presentation slide in the translated presentation materials may be highlighted or otherwise accentuated when they are discussed by the presenter, e.g., when those terms or related terms occur in the transcribed speech of the presenter.

In addition, as described above, terminology extracted from the presentation materials may be used to enhance the performance of the presentation translator, including the ASR module 305 and/or the MT module 310. For example, the extracted text may be used to bias the language model 308, and/or introduce missing words or terms to the vocabulary 307, or and new translations to the MT language model 312. Also, the extracted terminology may be correlated to other similar documents on the internet to obtain a more comprehensive extraction of pertinent terms, words, names that may be needed for ASR module 305 and MT module 310.

Still further, the extracted text may be used to assist human translators. For example, a condensed list of terminology from the slides, the speech, and/or other supporting materials may be extracted and delivered to a human translator(s) to assist the human translator(s) and/or human language learners. Also, technical translations for these special terms may be automatically provided for a human translator and interpreter. Still further, terminology lists or special terms may be shared with other students or listeners, via chat rooms or instant messaging, for example.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving, by an interface of a translation system, speech by a speaker in a first language;
   recognizing, by an automatic speech recognition module of the translation system, the received speech;
   transcribing the recognized speech in the first language;
   translating, by a machine translation module of the translation system, the speech transcription into a second language, the translated speech transcription stored in a file of a database of the translation system;
   receiving, by the interface of the translation system, presentation materials associated with the speech in the first language;
   extracting text in the first language from the presentation materials;
   translating, by the machine translation module, the extracted text into the second language;
   generating translated presentation materials in the second language based on the text in the second language;
   modifying the file storing the translated speech transcription by importing at least one formatting feature from the original or translated presentation materials into the translated speech transcription; and
   displaying, by a display device, the modified translated speech transcription.

2. The method of claim 1, further comprising modifying an automatic speech recognition language model of the translation system by:
   identifying a first unknown word in the extracted text;
   generating a pronunciation for the first unknown word; and
   modifying an automatic speech recognition language model probability associated with the first unknown word.

3. The method of claim 2, wherein modifying the automatic speech recognition language model further comprises:

receiving, based on an internet search, materials related to the extracted text;

identifying a second unknown word in the related materials;

generating a pronunciation for the second unknown word; and modifying an automatic speech recognition language model probability associated with the second unknown word.

4. The method of claim 1, further comprising modifying a machine translation language model of the translation system by:

identifying a third unknown word in the extracted original text;

receiving, based on an internet search, a translation of the third unknown word; and adding the translation to the machine translation language model.

5. The method of claim 1, wherein the original presentation materials comprise slides, the method further comprising generating a time-stamp associated with a transition from a first slide to a second slide.

6. The method of claim 5, wherein the modification comprises determining a paragraph break in the translated speech based on the time-stamp.

7. The method of claim 5, wherein the modification comprises inserting a punctuation mark in the transcription based on the time-stamp.

8. The method of claim 1, wherein the modification comprises:

identifying a mathematical formula in the translated speech; and generating an associated transcription using mathematical notation.

9. The method of claim 1, wherein the modification comprises:

identifying a first element in the transcription of the translated speech;

identifying a second element in the translated presentation materials, the second element corresponding to the first element; and generating a hyperlink between the first element and the second element.

10. The method of claim 1, wherein the speaker is a user of the translation system.

11. A computer program product for translating a multimedia presentation, the computer program product comprising a non-transitory computer-readable storage medium containing computer program code for:

receiving, by an interface of a translation system, speech by a speaker in a first language;

recognizing, by an automatic speech recognition module of the translation system, the received speech transcribing the recognized speech in the first language;

translating, by a machine translation module of the translation system, the speech transcription into a second language, the translated speech transcription stored in a file of a database of the translation system;

receiving presentation materials associated with the speech in the first language;

extracting text in the first language from the presentation materials;

translating, by the machine translation module, the extracted text into the second language;

generating translated presentation materials in the second language based on the text in the second language;

modifying the file storing the translated speech transcription by importing at least one formatting feature from the original or translated presentation materials into the translated speech transcription; and displaying, by a display device, the modified translated speech transcription.

12. The computer program product of claim 11, further comprising modifying an automatic speech recognition language model of the translation system by:

identifying a first unknown word in the extracted original text;

generating a pronunciation for the first unknown word; and modifying an automatic speech recognition language model probability associated with the first unknown word.

13. The computer program product of claim 12, wherein modifying the automatic speech recognition language model further comprises:

receiving, based on an internet search, materials related to the extracted original text;

identifying a second unknown word in the related materials;

generating a pronunciation for the second unknown word; and modifying an automatic speech recognition language model probability associated with the second unknown word.

14. The computer program product of claim 11, further comprising modifying a machine translation language model of the translation system by:

identifying a third unknown word in the extracted original text;

receiving, based on an internet search, a translation of the third unknown word; and adding the translation to the machine translation language model.

15. The computer program product of claim 11, wherein the original presentation materials comprise slides, the method further comprising generating a time-stamp associated with a transition from a first slide to a second slide.

16. The computer program product of claim 15, wherein the modification comprises determining a paragraph break in the transcription based on the time-stamp.

17. The computer program product of claim 15, wherein the modification comprises inserting a punctuation mark in the transcription based on the time-stamp.

18. The computer program product of claim 11, wherein the modification comprises:

identifying a mathematical formula in the translated speech; and generating an associated transcription using mathematical notation.

19. The computer program product of claim 11, wherein the modification comprises:

identifying a first element in the transcription of the translated speech;

identifying a second element in the translated presentation materials, the second element corresponding to the first element; and generating a hyperlink between the first element and the second element.

20. The computer program product of claim 11, wherein the speaker is a user of the translation system.

* * * * *